(12) United States Patent
Emmons

(10) Patent No.: US 10,125,629 B2
(45) Date of Patent: Nov. 13, 2018

(54) SYSTEMS AND METHODS FOR ASSESSING THE HEALTH OF A FIRST APPARATUS BY MONITORING A DEPENDENT SECOND APPARATUS

(71) Applicant: United Technologies Corporation, Farmington, CT (US)

(72) Inventor: Floyd R. Emmons, West Hartford, CT (US)

(73) Assignee: United Technologies Corporation, Farmington, CT (US)

(*) Notice: Subject to any disclaimer, the term of this patent is extended or adjusted under 35 U.S.C. 154(b) by 132 days.

(21) Appl. No.: 15/223,086

(22) Filed: Jul. 29, 2016

(65) Prior Publication Data
US 2018/0030851 A1 Feb. 1, 2018

(51) Int. Cl.
| | |
|---|---|
| F01B 21/00 | (2006.01) |
| F04D 27/00 | (2006.01) |
| F04C 14/28 | (2006.01) |
| F01D 17/12 | (2006.01) |
| F04B 51/00 | (2006.01) |
| F02C 3/04 | (2006.01) |
| F02C 7/22 | (2006.01) |

(Continued)

(52) U.S. Cl.
CPC ........... *F01D 21/003* (2013.01); *F01D 17/12* (2013.01); *F02C 3/04* (2013.01); *F02C 7/22* (2013.01); *F04B 51/00* (2013.01); *F04C 14/28* (2013.01); *F04C 28/28* (2013.01); *F04D 15/0088* (2013.01); *F04D 27/001* (2013.01); *G05B 23/0245* (2013.01); *G05B 23/0283* (2013.01); *F05D 2220/323* (2013.01); *F05D 2260/83* (2013.01)

(58) Field of Classification Search
CPC .......... F01D 17/12; F01D 21/003; F02C 3/04; F02C 7/22; F04B 51/00; F04C 14/28; F04C 28/28; F04D 15/0088; F04D 27/001; F05D 2220/323; F05D 2260/83
USPC ............ 702/33, 34, 57, 130, 144, 182–185; 66/327; 60/327
See application file for complete search history.

(56) References Cited

U.S. PATENT DOCUMENTS

| | | | |
|---|---|---|---|
| 2004/0230384 A1* | 11/2004 | Haynes | ................... F04B 17/03 702/57 |
| 2011/0056192 A1* | 3/2011 | Weber | ................... E02F 9/2242 60/327 |
| 2011/0056194 A1* | 3/2011 | Wojcicki | ................ E02F 9/2242 60/428 |

FOREIGN PATENT DOCUMENTS

| | | |
|---|---|---|
| EP | 2549415 A1 | 1/2013 |
| EP | 2853971 A2 | 4/2015 |

OTHER PUBLICATIONS

Extended European Search Report dated Dec. 14, 2017 in European Application No. 17183873.3.

* cited by examiner

*Primary Examiner* — John H Le
(74) *Attorney, Agent, or Firm* — Snell & Wilmer L.L.P.

(57) ABSTRACT

Systems and methods for assessing the health of a first apparatus by monitoring a second apparatus are described herein. A method for monitoring a health of a first apparatus may comprise receiving a performance parameter from a second apparatus, wherein performance of the second apparatus is dependent upon the health of the first apparatus, assessing the performance parameter, and determining the health of the first apparatus. In various embodiments, the performance parameter may comprise at least one of a speed (Continued)

value of the second apparatus, a position value of the second apparatus, a temperature value of the second apparatus, or a time value of the second apparatus.

13 Claims, 5 Drawing Sheets

(51) Int. Cl.
*F04D 15/00* (2006.01)
*F04C 28/28* (2006.01)
*F01D 21/00* (2006.01)
*G05B 23/02* (2006.01)

SYSTEMS AND METHODS FOR ASSESSING THE HEALTH OF A FIRST APPARATUS BY MONITORING A DEPENDENT SECOND APPARATUS

FIELD

This disclosure relates generally to health monitoring systems, and more particularly to a method for monitoring an apparatus.

BACKGROUND

In complex systems comprised of many components, or sub-systems, it may be desirable to assess the health of each of the individual components, or sub-systems, comprising the system in order to determine the health of the overall system. In such a system, it may be difficult to isolate a system failure due to the complex interaction amongst the components comprising the system. It is also desirable to be able to predict when a component's performance has degraded to the point where a maintenance action is beneficial so that the action can be performed prior to a system performance degradation. Typically, each component's health is assessed by a built-in-test ("BIT"), but in such a system all the individual components may not be accessible for BIT.

SUMMARY

Systems and methods for assessing the health of a first apparatus by monitoring a second apparatus are described herein, in accordance with various embodiments. A method for assessing a health of a first apparatus may comprise receiving a performance parameter from a second apparatus, wherein a performance of the second apparatus is dependent upon the health of the first apparatus, assessing the performance parameter, and determining the health of the first apparatus.

In various embodiments, the first apparatus may comprise a pump and the second apparatus may comprise an actuator powered by the pump. In various embodiments, the first apparatus may comprise an electric generator and the second apparatus may comprise an electric motor. The performance parameter may comprise at least one of a speed value of the second apparatus, a position value of the second apparatus, a temperature value of the second apparatus, and a time value of the second apparatus. The assessing the performance parameter may comprise trending the performance parameter to determine the health of the first apparatus. The trending the performance parameter may be to determine a degradation of the health of the first apparatus. The first apparatus may be unmonitored. The assessing the performance parameter may comprise assessing a health of the second apparatus. The assessing the performance parameter may comprise assessing the performance of the second apparatus. The determining the health of the first apparatus may comprise generating a prognosis of the health of the first apparatus.

An article of manufacture may comprise a controller and a tangible, non-transitory memory configured to communicate with the controller. The tangible, non-transitory memory may have instructions stored thereon that, in response to execution by the controller, cause the controller to perform operations, comprising receiving, by the controller, a performance parameter from a second apparatus, wherein a performance of the second apparatus is dependent upon a health of a first apparatus, assessing, by the controller, the performance parameter; and determining, by the controller, the health of the first apparatus.

In various embodiments, the first apparatus may comprise at least one of a pump or a generator. The second apparatus may comprise at least one of an actuator or an electric motor. The performance parameter may comprise at least one of a speed value of the second apparatus, a position value of the second apparatus, a temperature value of the second apparatus, and a time value of the second apparatus. The assessing may comprise trending, by the controller, the performance parameter to determine the health of the first apparatus. The trending the performance parameter may be to determine a degradation of the health of the first apparatus. The first apparatus may be unmonitored. The assessing may comprise assessing, by the controller, the performance of the second apparatus. The assessing may comprise assessing, by the controller, a health of the second apparatus. The determining the health of the first apparatus may comprise generating, by the controller, a prognosis of the health of the first apparatus.

A method for monitoring a health of a first unmonitored apparatus may comprise assessing a performance of a second monitored apparatus, the second monitored apparatus operatively coupled to the first unmonitored apparatus, the performance of the second monitored apparatus being dependent on the first unmonitored apparatus.

In various embodiments, the assessing the performance of the second monitored apparatus may comprise receiving a performance parameter from the second monitored apparatus, wherein the performance of the second monitored apparatus is dependent on the health of the first unmonitored apparatus. The assessing the performance of the second monitored apparatus may comprise assessing the performance parameter. The assessing the performance of the second monitored apparatus may comprise determining the health of the first apparatus.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

Figure 1:
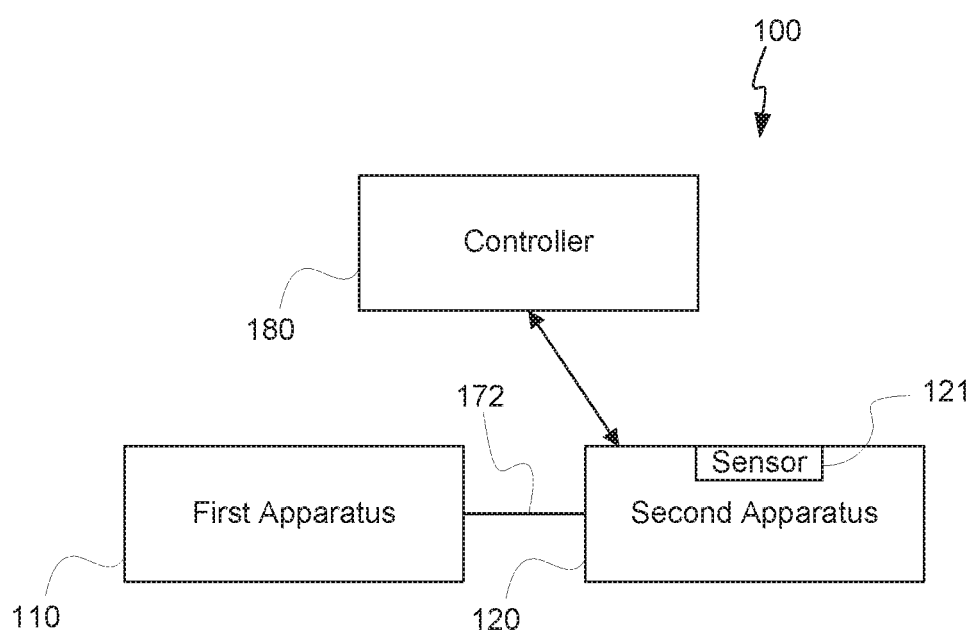
FIG. 1 illustrates a schematic view of a gas turbine engine, in accordance with various embodiments.

The detailed description of exemplary embodiments herein makes reference to the accompanying drawings, which show exemplary embodiments by way of illustration.

While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

In complex systems comprised of many components, or sub-systems, it may be desirable to assess the health of each of the individual components, or sub-systems, comprising the system in order to determine the health of the overall system. In such a system, it may be difficult to isolate a system failure due to the complex interaction amongst the components comprising the system. It is also desirable to be able to predict when a component's performance has degraded to the point where a maintenance action is beneficial so that the action can be performed prior to a system performance degradation. In a typical system, each component's health is assessed by a BIT, but in such a system all of the individual components may not be accessible for BIT. Therefore, in such cases it may be possible to monitor the performance of a second component which is dependent on an unmonitored first component for its function and/or performance. In this regard, the first component may be incapable of being monitored for accessibility reasons or other reasons, in accordance with various embodiments. The potential ambiguity of a degradation of the second monitored component being interpreted as a degradation of the first component can be mitigated by having BIT on the second component so the performance of the second component becomes a known quantity and its function can reflect the health of the first unmonitored component.

As an example, the first component could be an electric generator and the second component could be an electric motor which is powered by the generator. If the generator is not accessible for monitoring and the motor is accessible and can be monitored for health status, with reasonable certainty, then by monitoring the functioning of the motor the health of the generator can be determined.

With reference to FIG. 1, a schematic view of a system 100 is illustrated, in accordance with various embodiments. In various embodiments, system 100 may be aircraft propulsion system 400 (see FIG. 4). System 100 may include first apparatus 110 and second apparatus 120. In various embodiments, first apparatus 110 may be fuel pump 70 (see FIG. 4). In various embodiments, first apparatus 110 may comprise a generator. In various embodiments, first apparatus 110 may comprise a device having a health which is difficult to monitor and which is in communication with a second apparatus. In this regard, first apparatus 110 may be unmonitored. Health, in this regard, may refer to a measure of the performance of an apparatus in comparison to a desired performance. System 100 may include second apparatus 120. In various embodiments, second apparatus 120 may be actuator 27 (see FIG. 4). In various embodiments, second apparatus 120 may comprise an actuator, including electro-mechanical actuators, pneumatic actuators, and mechanical actuators. In various embodiments, second apparatus 120 may comprise a motor, including electrical motors. In various embodiments, second apparatus 120 may comprise a device having a performance which is monitored in order to determine a health of a first apparatus (i.e., first apparatus 110). In various embodiments, the operation of second apparatus 120 may be dependent on first apparatus 110. In this regard, first apparatus 110 may be in communication with second apparatus 120 via link 172. In various embodiments, link 172 may represent a wired communication, a wireless communication, a mechanical communication (i.e., a shaft, rod, lever, conduit, wire, etc.) or any other link for operatively coupling second apparatus 120 with first apparatus 110. In alternate embodiments, there may be no direct link between the components, however the first component depends on the second component.

Further, system 100 may include one or more sensors 121 that provides information (i.e., performance parameters values) about second apparatus 120. Therefore, various embodiments assess first apparatus 110 performance by tracking the performance of second apparatus 120, which is dependent upon the first apparatus for its performance. In this regard, second apparatus 120 may be monitored.

Further, system 100 may include a controller 180 for collecting data from various points and/or elements of system 100. Controller 180 may provide control signals to various elements of system 100. For example, controller 180 may provide control signals for controlling first apparatus 110. A controller may comprise a processor configured to implement various logical operations in response to execution of instructions, for example, instructions stored on a tangible, non-transitory computer-readable medium and/or memory configured to communicate with the controller 180. An article of manufacture may also comprise a tangible, non-transitory computer-readable storage medium having instructions stored thereon to be communicated to a controller. The instructions may cause the controller 180 to perform certain operations, as described herein. The controller 180 may receive pluralities of performance parameter values from a sensor 121, and determine the conditions under which system 100 is operating.

Figure 2A:
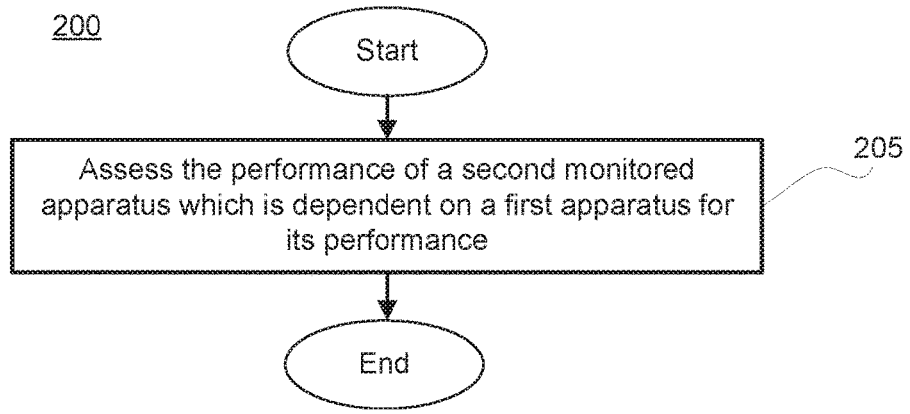
FIGS. 2A and 2B illustrate a method for monitoring a health of a first unmonitored apparatus based on collected data from a second monitored apparatus, in accordance with various embodiments.

With reference to FIG. 2A, a flow chart of a method 200 for assessing the health of a first unmonitored apparatus based on collected data from a second monitored apparatus is illustrated, in accordance with various embodiments of the present disclosure. The method 200 may include assessing the performance of a second unmonitored apparatus which is dependent on a first apparatus for its performance (step 205).

Figure 2B:
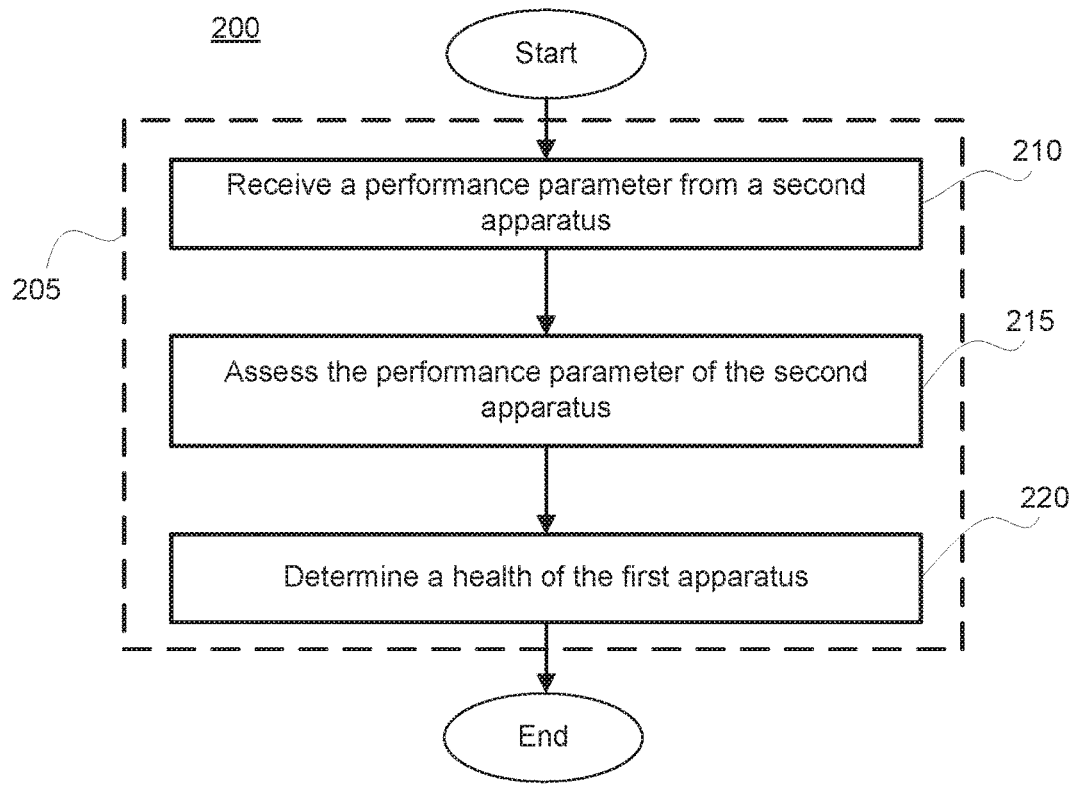

With reference to FIG. 2B step 205 may further include various sub-steps. In this regard, method 200 may further include receiving a performance parameter from a second apparatus (sub-step 210). Method 200 may further include assessing the performance parameter of the second apparatus (sub-step 215). Method 200 may further include determining a health of the first apparatus (sub-step 220).

With combined reference to FIG. 1, FIG. 2A, and FIG. 2B, step 205 may include assessing the performance of second apparatus 120, wherein second apparatus 120 is dependent upon first apparatus 110 for its performance. Sub-step 210 may include receiving a performance parameter from second apparatus 120. In various embodiments, a performance parameter may comprise a position value of an apparatus, a speed value of an apparatus, a time value of an apparatus, etc. In various embodiments, a performance parameter may comprise other values including pressure values (i.e., a pressure of a fluid of an apparatus such as a pump), temperature value (i.e., a temperature value of a fluid of an apparatus or a fluid of an apparatus), values related to entropy of an apparatus, values related to flow rate of a fluid of an apparatus, etc. In various embodiments, performance parameters may be received in time-series. Sub-step 215 may include assessing the performance parameter of second apparatus 120. Sub-step 215 may include assessing a health of second apparatus 120. Sub-step 215 may include assessing a performance of second apparatus 120. Sub-step 220 may include determining a health of first apparatus 110. For example, sub-step 215 and/or sub-step 220 may include assessing the performance parameter of second apparatus 120 at a first time and then comparing the performance parameter from the first time with a performance parameter received at a later second time. In this regard, the controller 180 may trend performance parameters over time to determine a degradation of a health of first apparatus 110 and/or second apparatus 120. In various embodiments, sub-step 220 may include generating a prognosis of the health of first apparatus 110. Such a prognosis may be reported to predict the desirability of maintenance.

As a further example, an aircraft propulsion system is described herein, in accordance with various embodiments. Various embodiments are directed to monitoring a number of different data values collected from the aircraft propulsion system that can be used to predict the remaining useful life left on an apparatus (i.e., first apparatus 110 of FIG. 1). In various embodiments, said apparatus may comprise a pump. In various embodiments, said pump may comprise a positive displacement pump such as a rotary positive displacement pump, a reciprocating positive displacement pump, or any other type of positive displacement pump including gear pumps, screw pumps, progressive cavity pumps, roots-type pumps, peristaltic pumps, plunger pumps, triplex-style plunger pumps, compressed-air-powered double diaphragm pumps, and/or rope pumps. Further, said pump may comprise an impulse pump such as a hydraulic ram pump. Furthermore, said pump may comprise a velocity pump such as a radial-flow pump, an axial-flow pump, a mixed-flow pump, and/or an educator-jet pump. Said pump may comprise any other type of pump including gravity pumps, steam pumps, and/or valveless pumps. In various embodiments, said pump may include a mechanical pump (i.e., a diaphragm pump), an electrical pump (including in-tank electrical pumps and inline electrical pumps), and/or a turbo pump (including axial turbo pumps and centrifugal turbo pumps). Particularly, because the rate at which the pump wears may be dependent upon its operational parameters, it is desirable to be able to monitor the health of the pump in use, that is to say to monitor its leakage characteristic, during service, in order to allow pumps to be taken out of service at the optimum time in relation to the life of the pump rather than at fixed maintenance intervals. Thus, in accordance with various embodiments, a pump could be replaced when its monitored health indicates that a failure may be imminent rather than replacing the pump at a fixed and pre-determined time. Pumps which are exhibiting less wear can remain in service longer.

In various embodiments, it will be recognized that, ignoring leakage in the pump, the output flow of a positive displacement pump is proportional to its rotation speed. Generally, positive displacement pumps in aircraft engine fuel supply systems are driven from an engine accessory gear box so that the pump speed is directly proportional to the speed of the associated engine.

Accordingly, various embodiments illustrate systems and methods to evaluate fuel pump performance by correlating the pump speed and the fuel actuated effectors such as actuator position(s) associated with admitting fuel flow for engine start. Specifically, during the start cycle, the metering valve will not admit fuel burn flow until all fuel actuated effectors have reached the commanded start position. Therefore, various embodiments establish a baseline point in a starter fuel pump speed where the fuel actuated effectors, such as a stator vane, reaches its desired position for admitting fuel flow for a new pump and then with subsequent operating data trend this operating point. As the pump wears the operating point will shift to a higher starter fuel pump speed and thus a limit can be established where the pump has reached the end of its useful life. In this regard, said pump, may comprise a fuel pump, in accordance with various embodiments.

In various embodiments, based on test data collected from an engine, it can be seen that fuel pump speed where the stator vane reaches its commanded position falls in a narrow fuel pump speed band. In contrast, in various embodiments, it can be appreciated that the stator vane starts to move to the start position at a low fuel pump speed. Further, it can be appreciated that the range can vary widely and will change over time as well as the fuel pump wears in addition to other factors that can affect this percentage such as temperature and wear of other components. In this regard, with reference to FIG. 1, second apparatus 120 may comprise an actuator, such as a stator vane, as described herein. However, in various embodiments, For example, with reference to FIG. 3, a schematic cross-sectional view of a gas turbine engine 12 that can also be called a fuel burning engine is shown in accordance with various embodiments.

Figure 3:
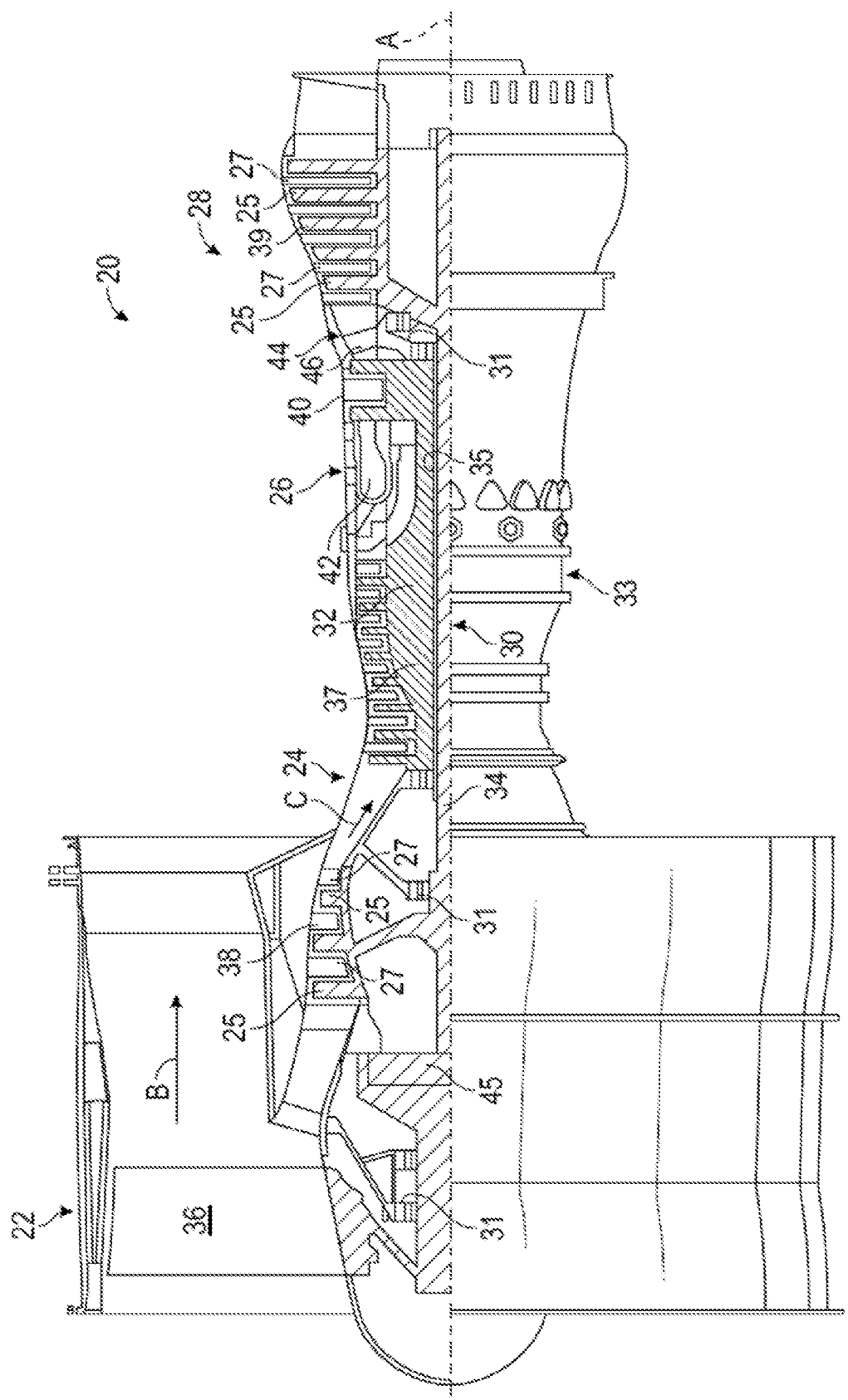
FIG. 3 illustrates a schematic view of a gas turbine engine, in accordance with various embodiments.

Specifically, FIG. 3 schematically illustrates a gas turbine engine 12 that is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 12 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In various embodiments, the inner shaft 34 and the outer shaft 35 may be supported at various axial locations by bearing systems 31 positioned within the engine static structure 33, as illustrated in FIG. 3.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

In various embodiments of the exemplary gas turbine engine 12, a significant amount of thrust is provided by the bypass flow path B due to the high bypass ratio. Each of the compressor section 24 and the turbine section 28 may include alternating rows of rotor assemblies and vane assemblies that carry airfoils that extend into the core flow path C. For example, the rotor assemblies can carry a plurality of rotating blades 25, while each vane assembly can carry a plurality of actuators 27 that extend into the core flow path C. The blades 25 of the rotor assemblies create or extract energy (in the form of pressure) from the core airflow that is communicated through the gas turbine engine 12 along the core flow path C. The actuators 27 of the vane assemblies direct the core airflow to the blades 25 to either add or extract energy. In various embodiments, the actuators 27 may comprise stator vanes.

Figure 4:
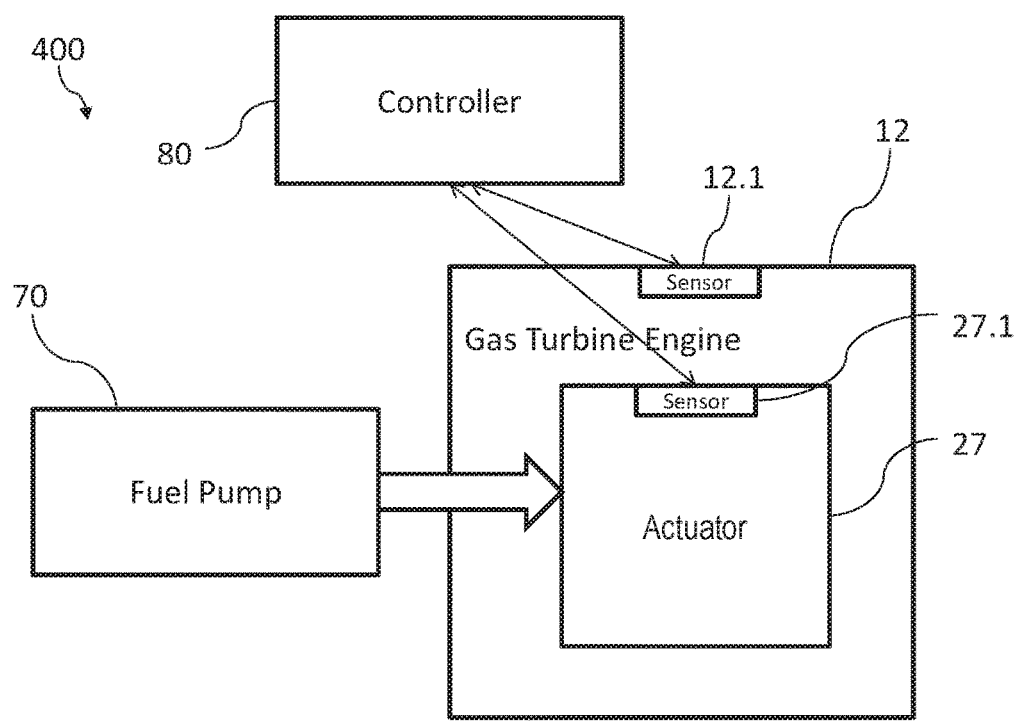
FIG. 4 illustrates a schematic view of an aircraft propulsion system, in accordance with various embodiments.

Accordingly, the gas turbine engine 12 is part of an aircraft propulsion system 400 that further includes a fuel pump 70 that provides fuel to a number of different components of the gas turbine engine 12 as well as a controller 80 for collecting data from various points and/or elements of the gas turbine engine 12 as well as providing control signals as shown in FIG. 4. As noted above, during a starting period different values can be tracked and used to calculate the remaining useful life of at least the fuel pump 70.

Specifically, FIG. 4 is a block diagram schematic of an aircraft propulsion system 400. The aircraft propulsion system 400 includes at least a gas turbine engine 12 that can also be called a fuel burning engine, as shown in FIG. 3, as well as a fuel pump 70 that provides fuel to the gas turbine engine 12 based on control signals received from a controller 80. Further, the aircraft propulsion system 400 includes a plurality of sensors 12.1, and 27.1 A gas turbine sensor 12.1 can also provide the controller with specific information about the gas turbine engine 12 such as the fuel pump speed of the engine as it starts up. Further, the aircraft propulsion system 400 can also include an actuator sensor 27.1 that provides information (i.e., performance parameters) about the actuator 27 such as the current position percentage the actuator 27. For example, actuator sensor 27.1 may measure an angular displacement of actuator 27. Therefore, various embodiments assess fuel pump performance by tracking the performance of a second apparatus, for example an actuator, which is dependent upon the fuel pump for its performance. According to various embodiments, because the actuator's performance can also degrade independent of the fuel pump an additional provision is that the actuator be monitored during normal engine operation so that during starting its health can be reasonably be assured to be within normal limits.

Using the stator vane actuator as an example, when the engine 12 is completely off, the actuator sensor 27.1 can record a stator vane actuator position full, or near full, open. As the engine is cranked for startup and the fuel pressure is supplied from the pump to the stator vane actuator 27, the stator vane actuator position will rapidly decrease to the starting commanded position and this generally occurs at a constant value of starter fuel pump speed. Further, as the fuel pump wears, the speed at which the stator vane actuators reach the commanded position will increase and, in extreme cases, can result in the engine failing to start. Thus, various embodiments can "track" the starter fuel pump speed at which the actuator reaches its commanded value over many start cycles. According to various embodiments, these values of the stator vane actuator position can be completely different. The change of the position values over time can indicate system wear, specifically, fuel pump 70 wear.

Figure 5A:
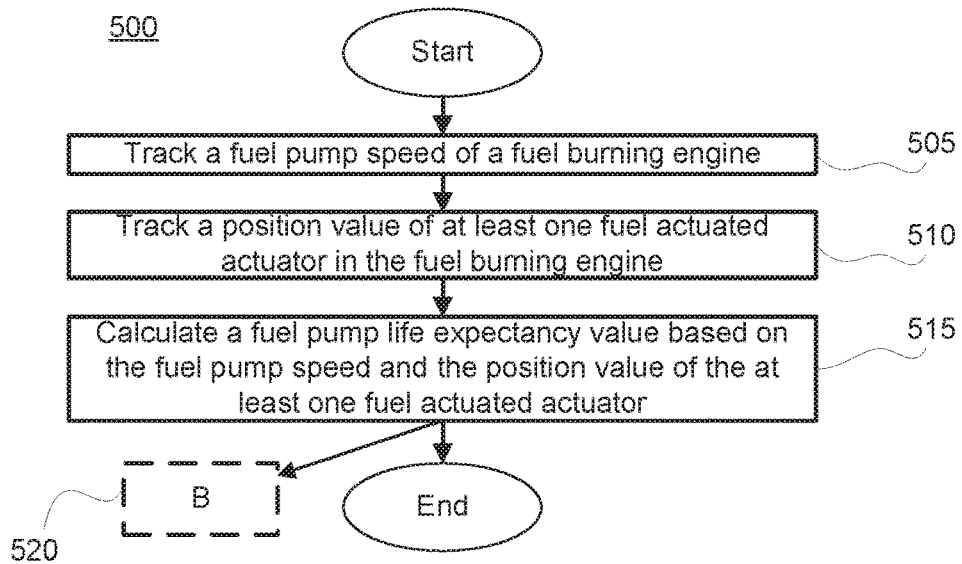
FIGS. 5A and 5B illustrate a method for determining the useful life of a fuel pump based on collected data, in accordance with various embodiments.

With reference to FIG. 5A, a method 500 for determining the useful life of a fuel pump (i.e., fuel pump 70) based on collected data is illustrated, in accordance with various embodiments. Method 500 may include tracking a fuel pump speed of a fuel burning engine (i.e., gas turbine engine 12) (step 505). The method 500 may further include tracking a position value of at least one fuel actuated actuator (i.e., actuators 27) in the fuel burning engine (step 510). Further, method 500 may include calculating a fuel pump life expectancy value based on the fuel pump speed and the position value of the at least one fuel actuated actuator (step 515). According to various embodiments, the method 500 may include other operations as indicated by operation 320 and further discussed below in FIG. 5B.

Figure 5B:
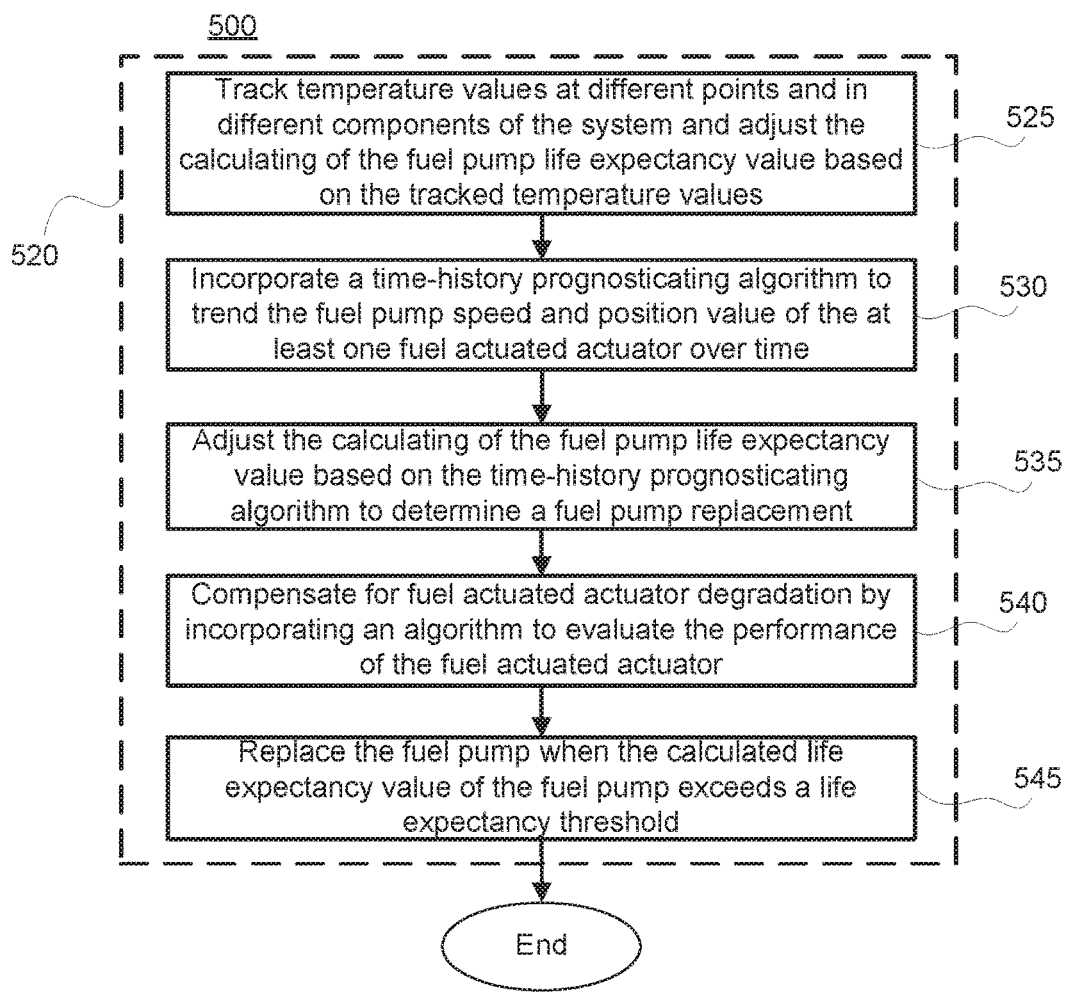

With reference to FIG. 5B, method 500 may further include tracking temperature values at different points and in different components of the system and adjusting the calculating of the fuel pump life expectancy value based on the tracked temperature values (step 525). For example, a temperature of a fluid (i.e., fuel) of the system may be tracked. In various embodiments, a temperature of any component of the system (i.e., second apparatus 120 of FIG. 1) may be tracked. Method 500 may also include incorporating a time-history prognosticating algorithm to trend the fuel pump speed and position value of the at least one fuel actuated actuator over time (step 530). Further, method 500 may include adjusting the calculating of the fuel pump life expectancy value based on the time-history prognosticating algorithm to determine a fuel pump replacement (step 535). Method 500 may also include compensating for fuel actuated actuator degradation by incorporating an algorithm to evaluate the performance of the fuel actuated actuator (step 540). Method 500 may include replacing the fuel pump when the calculated life expectancy value of the fuel pump exceeds a life expectancy threshold (step 545).

According to various embodiments, in a gas turbine engine the engine starting cycle is initiated with the starter turning the rotating turbomachinery and the fuel pump while the engine control (EEC or FADEC) commands all the fuel actuated effectors to a "start" position. The actuation is by fuel supplied by the fuel pump driving a piston in a cylinder (fueldraulic) actuator. The fuel will not be admitted to the combustion chamber until all fuel actuated effectors (stator vanes) are in the start position. As the fuel pump wears and the capacity at a given speed decreases thus, the speed at which the positioning of the effectors to the starting position during the starting cycle will increase. In order to avoid ambiguity due to a slow actuator (low slew rate) a separate actuator BIT algorithm can be implemented in the control to flag a slow actuator and the BIT tolerance will be implemented in the software.

Therefore, various embodiments disclosed herein record and track this speed along with fuel temperature and trend it over an extended period of time and predict the associated maintenance action. It is understood that a plurality of engine starts will have to be accumulated to establish a normalized data base from which an operational performance trend can be determined.

Algorithms to analyze and trend the data form part of this disclosure. Specifically, according to various embodiments, after collecting the data from the system as described above, the data is then compared and correlated to each other. And correlated events than coincide with fuel pump deterioration can be detected, recorded, and then tracked for any recurrence or trend toward recurrence that would indicate that the fuel pump is deteriorating. Then once the collected values reach a certain threshold value the fuel pump can be replaced. For example, in accordance with various embodiments, when the stator vane actuator position is at or below 10% and the start speed is near or above 20%, the system can determine that based on previously collected data the current fuel pump had reached its threshold usefulness and should be replaced. According to various embodiments, these values can be adjusted based the specifics of the given aircraft, engine, and fuel pump.

Advantageously, various embodiments described herein provide reduced maintenance cost by not indicating a timed fuel pump replacement, thus replacement can be on-condition as determined by the defined algorithm. Additionally, various embodiments described herein provide minimizing the number of engine no-start events resulting in flight delays. Further, various embodiments described herein provide minimizing engine events from not producing enough power due to poor fuel pump performance.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for assessing a health of a first apparatus, comprising:
   receiving a first performance parameter at a first time from a sensor of a second apparatus, wherein a performance of the second apparatus is dependent upon the health of the first apparatus;
   receiving a second performance parameter at a second time from the sensor of the second apparatus;
   comparing the first performance parameter with the second performance parameter; and
   determining the health of the first apparatus based upon the comparison;
   wherein the first apparatus comprises at least one of a pump or a generator,
   the second apparatus comprises an actuator in response to the first apparatus comprising a pump,
   the second apparatus comprises an electric motor in response to the first apparatus comprising a generator, and
   the first performance parameter and the second performance parameter each comprises at least one of a speed value of the second apparatus, a position value of the second apparatus, a temperature value of the second apparatus, and a time value of the second apparatus,
   wherein the first apparatus is unmonitored.

2. The method of claim 1, wherein the assessing the performance parameter comprises trending the first performance parameter and the second performance parameter to determine the health of the first apparatus.

3. The method of claim 2, wherein the trending the first performance parameter and the second performance parameter is to determine a degradation of the health of the first apparatus.

4. The method of claim 1, wherein the first apparatus is unmonitored.

5. The method of claim 1, wherein the comparing the first performance parameter with the second performance parameter comprises at least one of:
   assessing a health of the second apparatus; and
   assessing the performance of the second apparatus.

6. The method of claim 1, wherein the determining the health of the first apparatus comprises generating a prognosis of the health of the first apparatus.

7. An article of manufacture, comprising:
a controller; and
a tangible, non-transitory memory configured to communicate with the controller, the tangible, non-transitory memory having instructions stored thereon that, in response to execution by the controller, cause the controller to perform operations, comprising:
receiving, by the controller, a first performance parameter at a first time from a sensor of a second apparatus, wherein a performance of the second apparatus is dependent upon a health of the first apparatus;
receiving, by the controller, a second performance parameter at a second time from the sesnsor of the second apparatus;
comparing, by the controller, the first performance parameter with the second performance parameter; and
determining, by the controller, the health of the first apparatus based upon the comparison;
wherein the first apparatus comprises at least one of a pump or a generator,
the second apparatus comprises an actuator in response to the first apparatus comprising a pump,
the second apparatus comprises an electric motor in response to the first apparatus comprising a generator, and
the first performance parameter and the second performance parameter each comprises at least one of a speed value of the second apparatus, a position value of the second apparatus, a temperature value of the second apparatus, and a time value of the second apparatus.

8. The article of manufacture of claim 7, wherein the assessing comprises trending, by the controller, the first performance parameter and the second performance parameter to determine the health of the first apparatus.

9. The article of manufacture of claim 8, wherein the trending the first performance parameter and the second performance parameter is to determine a degradation of the health of the first apparatus.

10. The article of manufacture of claim 7, wherein the first apparatus is unmonitored.

11. The article of manufacture of claim 7, wherein the comparing comprises at least one of:
assessing, by the controller, the performance of the second apparatus; and
assessing, by the controller, a health of the second apparatus.

12. The article of manufacture of claim 7, wherein the determining the health of the first apparatus comprises generating, by the controller, a prognosis of the health of the first apparatus.

13. A method for monitoring a health of a first unmonitored apparatus, comprising:
assessing a performance of a second monitored apparatus, the second monitored apparatus operatively coupled to the first unmonitored apparatus, the performance of the second monitored apparatus being dependent on the first unmonitored apparatus;
wherein the assessing the performance of the second monitored apparatus comprises receiving a first performance parameter at a first time from a sensor of the second apparatus, wherein a performance of the second apparatus is dependent upon the health of the first apparatus;
receiving a second performance parameter at a second time from the sensor of the second monitored apparatus;
comparing the first performance parameter with the second performance parameter; and
determining the health of the first unmonitored apparatus based upon the comparison;
wherein the first unmonitored apparatus comprises at least one of a pump or a generator,
the second monitored apparatus comprises an actuator in response to the first unmonitored apparatus comprising a pump,
the second monitored apparatus comprises an electric motor in response to the first unmonitored apparatus comprising a generator, and
the first performance parameter and the second performance parameter each comprises at least one of a speed value of the second apparatus, a position value of the second apparatus, a temperature value of the second apparatus, and a time value of the second apparatus.

* * * * *